E. B. HESS.
WIND SHIELD FOR AUTOMOBILES.
APPLICATION FILED OCT. 18, 1916.
1,244,855.
Patented Oct. 30, 1917.
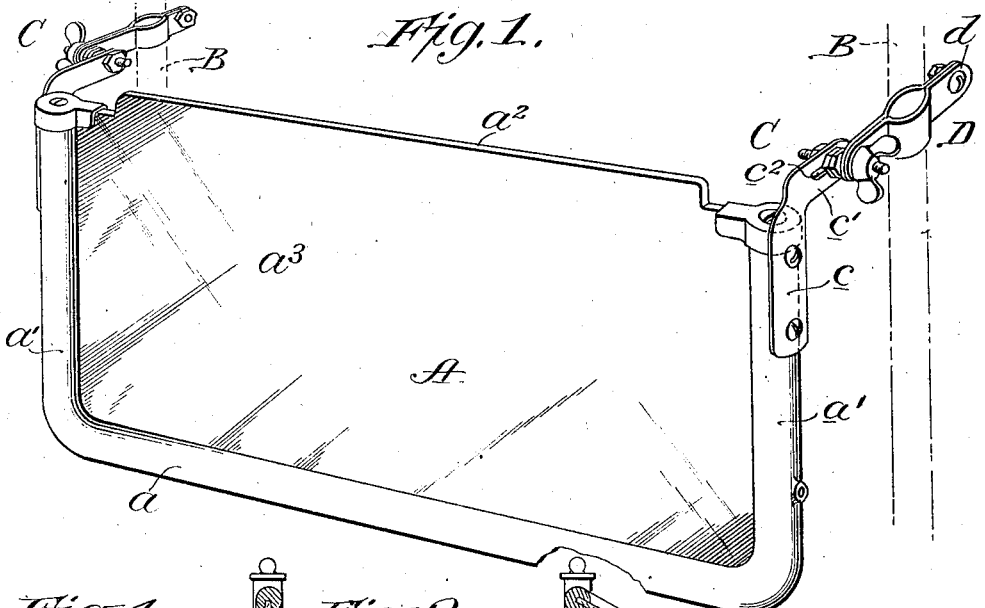
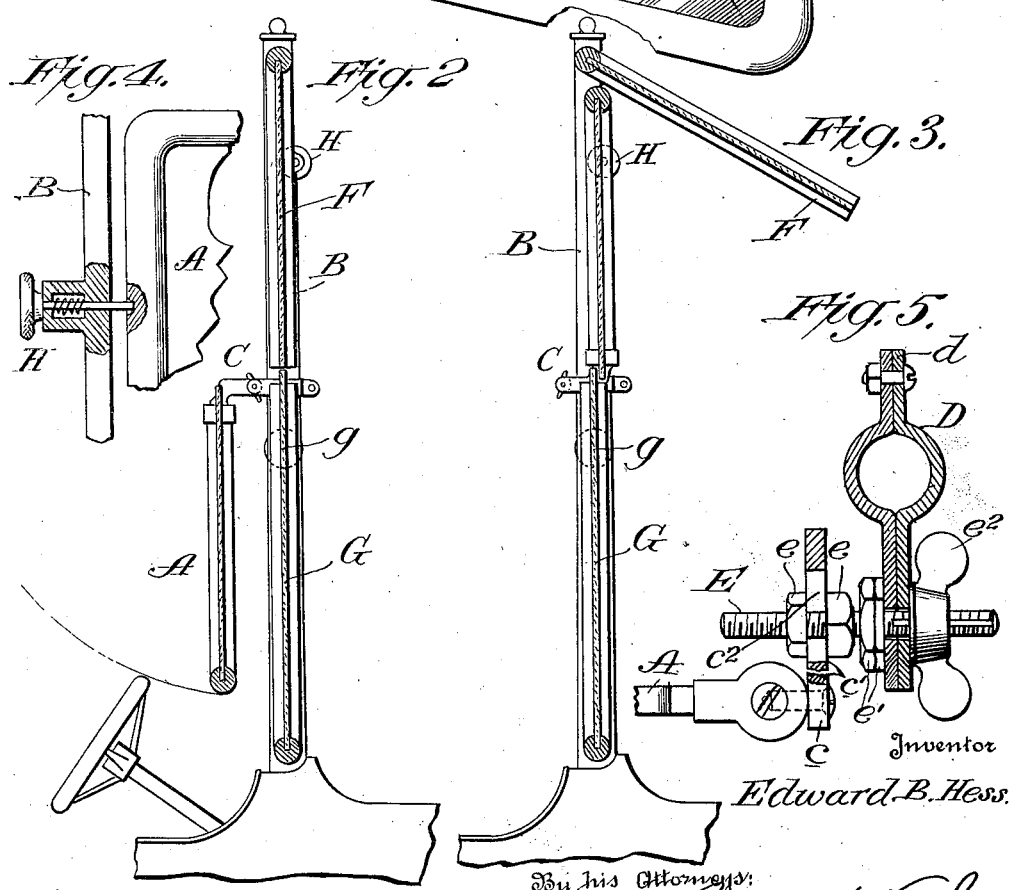
Inventor
Edward B. Hess.
By his Attorneys

UNITED STATES PATENT OFFICE.

EDWARD B. HESS, OF BROOKLYN, NEW YORK.

WIND-SHIELD FOR AUTOMOBILES.

1,244,855.      Specification of Letters Patent.      Patented Oct. 30, 1917.

Application filed October 18, 1916. Serial No. 126,376.

*To all whom it may concern:*

Be it known that I, EDWARD B. HESS, a citizen of the United States, residing at Brooklyn, in the county of Kings and State of New York, have invented certain new and useful Improvements in Wind-Shields for Automobiles, of which the following is a specification.

The object of this invention is to provide a wind shield for automobiles that may be readily applied to the supporting standards or frame of a wind shield in order to supplement the shield sections with which said supports are equipped or as a substitute for one of them.

Some automobiles have shield sections which may be adjusted to entirely close the shield or the upper section may be raised and extended forwardly but in such case the upper portion of the shield below the upper section is left open and one of the objects of my invention is to provide a shield section which may be easily applied to the shield standards and so mounted that it may hang in a lowered position below the line of vision or may, when the upper section is extended, be raised to a position above the lower section and below the extended upper one whereby the shield as a whole may be fully closed when the extended upper section will serve as a guard to prevent rain or snow from driving against or lodging upon the surface of the auxiliary section.

A shield section made in accordance with my invention may be held by the car owner as an extra section to be applied by himself whenever needed or desired, or such shield sections may be kept in stock by dealers, immediately supplied when called for and quickly applied to a shield and properly associated with the other sections thereof.

My shield section is equipped with devices whereby it may be easily attached to the shield standards or to parts projecting therefrom and whereby it may be turned or adjusted to different positions to accommodate varying conditions. These devices are also preferably so constructed that they may be adjusted to enable the shield section to be applied to supports of different widths and to standards of various sizes.

In the accompanying drawings I have shown one of the ways of constructing a wind shield in accordance with my invention and have indicated a way in which it may be applied to the standards of a wind shield, it being understood that one of the principal features of my invention is to so construct and equip the auxiliary section or the standards of the wind shield that said auxiliary section may be easily applied to an existing wind shield, that is, to wind shields of standard make equipped with other shield sections.

Figure 1 is a perspective view showing the supplemental or auxiliary wind shield section, and it indicates how it may be applied to the standards or to the supporting frame of an existing wind shield.

Fig. 2 shows, in side elevation, a portion of the body of an automobile and in vertical section a wind shield to which one of my supplemental or auxiliary shields has been applied.

In Fig. 2 the upper and lower sections of the shield are in closed position and the auxiliary or supplemental shield is in its lowered position.

Fig. 3 is a view similar to Fig. 2 but shows the auxiliary section in its raised position.

Fig. 4 is a detail view, showing a device which may be employed for holding the auxiliary section in its raised position.

Fig. 5 is a detail view of the devices for connecting the supplemental or auxiliary section with the wind shield standards.

Referring to Fig. 1, the auxiliary or supplemental shield section A is preferably provided with a frame comprising a lower portion $a$ and side portions $a'$. The remaining edge $a^2$ of the transparent portion $a^3$ is preferably frameless. The standards of the wind shield are indicated at B, and C indicates devices for attaching the supplemental or auxiliary shield section to the standards. Obviously such devices may vary widely in details of construction and yet serve the purpose of enabling a supplemental or auxiliary section to be readily applied to existing or standard wind shields. The devices for this purpose shown in Fig. 1 are similar on opposite sides of the shield and each comprises a bracket $c$ attached to the side frame of the shield sections near the frameless end thereof. This bracket has a lateral extension $c'$ which is slotted, as indicated at $c^2$.

D indicates a clamp which may be applied laterally to the standards B. Preferably the clamp comprises two plates joined at one end by a bolt $d$ while the other ends of the plates are formed with openings through which extends a bolt E which bolt also extends through the slot $c^2$ in the bracket $c'$. The bolt carries nuts $e$ on opposite sides of the bracket and it also carries nuts $e'$, $e^2$ on opposite sides of the clamp plates D. By this arrangement the auxiliary section may be moved fore and aft close to or farther from the main lower section of the shield and the nuts $e$, $e'$, $e^2$ may be adjusted on the bolts E to accommodate varying widths of supporting frames and to properly support the auxiliary shield section. While these devices are preferred they are not essential.

When the auxiliary section is applied to a standard or existing wind shield it may be mounted and operated in the manner indicated in Figs. 2 and 3. As there shown the wind shield comprises an upper section F and a lower section G. The upper section may hang in a vertical plane, as indicated in Fig. 2, or it may be extended in the manner indicated in Fig. 3. The lower section G may be pivoted at $g$ so as to be capable of swinging inward for purposes of ventilation when desired. The auxiliary or supplemental section A is connected by the devices C to the standards B about midway between their upper and lower ends, preferably about on a line between the lower edge of the upper sections and the top of the lower sections when these two sections are closed although this is not essential. The application of the fastening devices can be at any suitable elevation to accommodate wind shields of varying constructions. When the auxiliary section is in lowered position, as indicated in Fig. 2, it may be held firmly by the nut $e^2$. When the auxiliary section is raised to the position shown in Fig. 3 it may be held by the nuts $e^2$ and also by fastening devices H of the kind shown in Fig. 4 and which are of well known construction.

I have shown in the drawings one way of applying my invention to an existing or standard wind shield, but it will be understood that there are various makes of wind shields on the market and I wish it understood that I contemplate a wind shield which may be provided with devices or which may be associated with devices for readily attaching it or applying it to wind shields of various kinds.

I claim as my invention:

1. A windshield comprising: supporting means, upper and lower shield sections carried by said supporting means, means for swinging the upper section outwardly to form a rain shed, a bracket mounted on the supporting means independently of said sections and substantially intermediate the upper and lower sections, said bracket having a rearwardly extending portion, an auxiliary shield section carried by said bracket, normally occupying a pendent position in rear of the lower section, a pivot intermediate the ends of the bracket and in a vertical plane between the lower section and the auxiliary section for swinging the auxiliary section into an inverted upright position above the lower section when the upper section is in its rain shed position.

2. A windshield comprising: supporting means, upper and lower shield sections carried by said supporting means, means for swinging the upper section outwardly to form a rain shed, a bracket mounted on the supporting means independently of said sections and substantially intermediate the upper and lower sections, said bracket having a rearwardly extending portion, an auxiliary shield section carried by said bracket, normally occupying a pendent position in rear of the lower section, a pivot intermediate the ends of the bracket and in a vertical plane between the lower section and the auxiliary section for swinging the auxiliary section into an inverted upright position above, in front of and slightly overlapping the lower section when the upper section is in its rain shed position.

3. A windshield comprising: supporting means, upper and lower shield sections carried by said supporting means, means for swinging the upper section outwardly to form a rain shed, a bracket mounted on the supporting means independently of said sections and substantially intermediate the upper and lower sections, said bracket having a rearwardly extending portion, an auxiliary shield section carried by said bracket, normally occupying a pendent position in rear of the lower section, a pivot intermediate the ends of the bracket and in a vertical plane between the lower section and the auxiliary section for swinging the auxiliary section into an inverted upright position above the lower section when the upper section is in its rain shed position, and means for adjusting said bracket at its pivotal point to bring the auxiliary section toward or away from the lower section.

4. A windshield comprising: supporting means, upper and lower shield sections carried by said supporting means, means for swinging the upper section outwardly to form a rain shed, a bracket mounted on the supporting means independently of said sections and substantially intermediate the upper and lower sections, said bracket having a rearwardly extending portion, an auxiliary shield section carried by said bracket, normally occupying a pendent position in rear of the lower section, a pivot intermediate the ends of the bracket and in a vertical plane between the lower section and the auxiliary section for swinging the auxiliary section into an inverted upright position above the lower section when the upper section is in its rain shed position, and means for adjusting the auxiliary section at said pivotal point in a lateral direction.

5. A wind shield comprising: supporting means, upper and lower shield sections carried by said supporting means, means for swinging the upper section outwardly to form a rain shed, a two-part bracket mounted on the supporting means independent of said sections and substantially intermediate the upper and lower sections, an auxiliary shield section carried by said bracket normally occupying a pendent position in rear of the lower section, a pivot connecting said two-part bracket in a vertical plane between the lower section and the auxiliary section for swinging the latter into an inverted upright position above the lower section when the upper section is in its rain shed position.

6. A wind shield comprising: supporting means, upper and lower shield sections carried by said supporting means, means for swinging the upper section outwardly to form a rain shed, an auxiliary shield section, members on the supporting means extending rearwardly, members on the auxiliary shield section extending forwardly, and a pivot connecting the members on the supporting means and auxiliary section to admit of swinging the auxiliary section into an inverted upright position above the lower section when the upper section is in its rain shed position.

7. A wind shield comprising: supporting means, upper and lower shield sections carried by said supporting means, means for swinging the upper section outwardly to form a rain shed, an auxiliary shield section, members on the supporting means extending rearwardly, members on the auxiliary shield section extending forwardly, a pivot connecting the members on the supporting means and auxiliary section to admit of swinging the auxiliary section into an inverted upright position above the lower section when the upper section is in its rain shed position, and means for adjusting the pivots that connect the complementary members on the supporting means and the auxiliary section.

In testimony whereof, I have hereunto subscribed my name.

EDWARD B. HESS.